Jan. 23, 1962  J. R. GARDNER  3,017,708
TREE EXCAVATOR AND TRANSPLANTER
Filed March 24, 1958  2 Sheets-Sheet 1
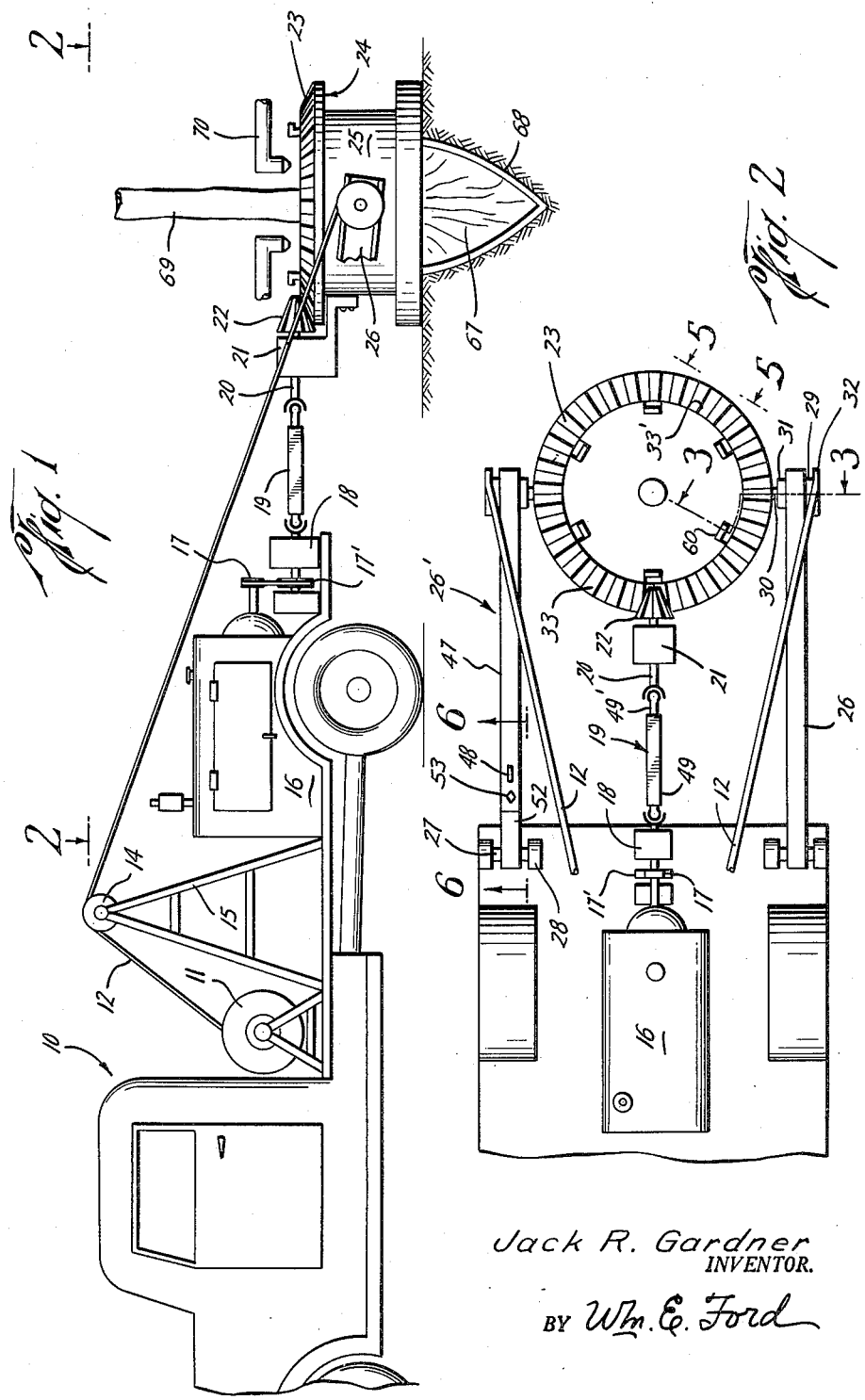
Jack R. Gardner
INVENTOR.
BY Wm. E. Ford
ATTORNEY Jan. 23, 1962        J. R. GARDNER        3,017,708
TREE EXCAVATOR AND TRANSPLANTER
Filed March 24, 1958        2 Sheets-Sheet 2
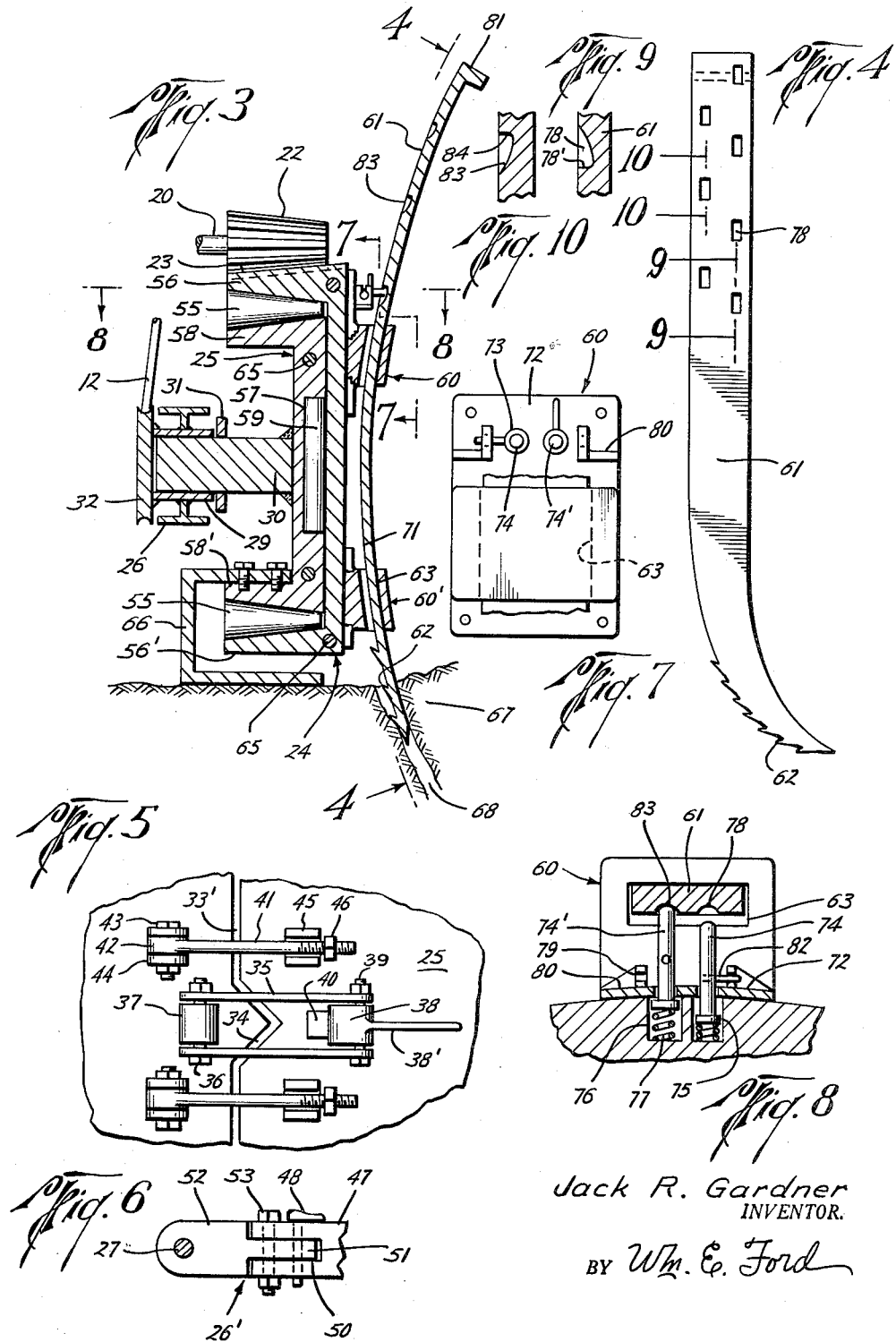
Jack R. Gardner
INVENTOR.
BY Wm. E. Ford
ATTORNEY United States Patent Office 3,017,708
Patented Jan. 23, 1962

3,017,708
TREE EXCAVATOR AND TRANSPLANTER
Jack R. Gardner, Clute, Tex., assignor, by mesne assignments, to Reed Roller Bit Company, Houston, Tex., a corporation of Texas
Filed Mar. 24, 1958, Ser. No. 723,170
7 Claims. (Cl. 37—2)

This invention relates to a tree excavator and transplanting machine adapted to be installed about the trunk of a tree to dig downwardly and excavate the roots with soil attached thereto, and thereafter to lift the excavated tree and transport it away, as excavated.

It is a primary object of this invention to provide such a tree excavating and transplanting machine which can readily excavate a hole to receive a tree therein, and then excavate a tree and transport it away with roots and soil attached thereto and deposit it in the hole in position to continue growth.

It is further an object of this invention to provide such a machine which in operation employs equipment conventionally employed by motor vehicles.

It is another object of this invention to provide such a machine in which friction is minimized.

It is also a further object of this invention to provide such a machine equipped to feed its cutting blades downwardly and toward the center below the rotary table of the machine, thereby excavating trees and the like with the roots and soil attached thereto in the form of a tapered, easily handled mass.

It is yet another object of this invention to provide a machine of this class which may be employed as a transplanter as well as an excavator in that it can employ its basic equipment to transport an excavated tree to a new location and deposit the tree into a hole previously dug to receive the tree for transplantation.

Other and further objects will be apparent when the specification herein is considered in connection with the drawings in which:

FIG. 1 is an elevational view showing the invention in the process of depositing an excavated mass in a previously excavated hole, the tree attached to the mass not being shown;

FIG. 2 is a plan view taken along line 2—2 of FIG. 1;

FIG. 3 is a sectional elevation taken along line 3—3 of FIG. 2;

FIG. 4 is an enlarged view of one of the cutting blades of the machine taken along line 4—4 of FIG. 3;

FIG. 5 is an enlarged elevational detail of the table latching arrangement taken along line 5—5 of FIG. 2;

FIG. 6 is an enlarged elevation, part in section, taken along line 6—6 of FIG. 2;

FIG. 7 is an elevational view, part in section, taken along line 7—7 of FIG. 3;

FIG. 8 is a plan view, part in section taken along line 8—8 of FIG. 3;

FIG. 9 is a fragmentary sectional elevation taken along line 9—9 of FIG. 4; and

FIG. 10 is a fragmentary sectional elevation taken along line 10—10 of FIG. 4.

Referring in detail to the drawings in which corresponding reference numerals are assigned to corresponding elements in the various views, a motor vehicle as a truck 10 is shown in FIG. 1 having a winch 11 adjacent the cab from which cables 12 extend over a pulley means 14 mounted at the top of an A-frame 15. Rearwardly of the A-frame 15, a gasoline engine 16 is carried on the bed of the truck 10 and through a suitable pulley speed reduction 17, 17' a speed reducer 18 is driven from the engine 16 to rotate a torque tube or universal connection member 19 which in turn drives a shaft 20 journalled at 21 on an outer, cylindrical table 25, to drive a tapered pinion 22 which meshes with a tapered ring gear 23 forming an essential part of an inner rotary table 24, such tables to be hereinbelow described in detail.

Arms 26 and 26' are mounted on pivot pins 27 supported by brackets 28 on the rear corners of the bed of the truck 10 and such arms extend to opposite sides of the table assembly 24, 25 and are connected to hubs which slidably fit about pivot pins 30 which extend outwardly from opposite sides of the outer table 25. A suitable spacer plate 31 is welded to each pivot pin 30 to space the arm outwardly thereon, and a pulley 32 is connected to the outer end of the hub 29 and a cable 12 connected to each pulley 32, the cables serving as guys for the arms 26, 26' and to lift the assembly 24, 25, as required.

Both the outer table 25 and inner table 24 are split, such split being indicated at 33, 33' in FIG. 2. Also such split is indicated at 33' in FIG. 5 in which an additional V-shaped split 34 is shown to insure firmer interfitment between the two sections of the tables. Latching is accomplished after the sections of the two tables are assembled by means of links 35 which are pivoted on a pivot bolt 36 extending through a lug 37 on the table 25, a latch cam 38, having a pivot bolt 39 therethrough on which the other ends of the links 35 are pivoted, being turned by its handle 38' to cam against a cam lug 40 to effectuate such latching. Thus the sections of the outer table 25 are latched together and the sections of the inner table 24 are obviously constrained thereby in latched position. Additionally bolts 41 having pivot rings 42 on one end thereof, are pivoted on pivot bolts 43 supported in lugs 44 welded to the table 25, the other ends of such bolts 43 being threaded and fitting in notched or slotted lugs 45 so that when the nuts 46 are tightened the table sections are more firmly latched together.

It is necessary that at least one of the arms 26 or 26' be swingable horizontally outwardly at an angle to the longitudinal axis of the vehicle 10 so that it may be backed up in position for the table sections to be assembled about a tree to be excavated. Thus, as shown in FIGS. 2 and 6, the arm 26' is shown thus constructed of two parts, the part 52 having a tongue 51 to interfit within a groove 50 in the part 47 which is pivotally connected to a section of the outer or stationary table 25. A bolt 53 forms the pivot member which connects the parts 47, 52 by passing through the respective grooved and tongued ends thereof, and a pin 48 having a head thereon may be dropped through aligned holes in such respective grooved and tongued parts to thereafter hold the arm 26' in parallel alignment with the arm 26 as the tables 24, 25 are assembled. Later, as after an excavated tree has been delivered to a new location and transplanted, and the machine is ready to be installed about another tree, the pin 48 may be removed and the arm 26' pivoted horizontally outwardly.

The journal bracket 21 is connected to the stationary table 25 with the shaft 20 journalled in such bracket 21, and thereby the pinion 22 on such shaft is permanently positioned in mesh with the ring gear 23. The torque tube 19 includes a sleeve member or Kelly 49 of rectangular or square inner cross-section and receives into either end thereof slidable members 49' of corresponding cross-section, such members 49' having their ends outward of the Kelly universally connected respectively to be driven by the shaft of the speed reducer 18, and universally connected to drive the pinion shaft 20. Thus the longitudinal distance between the end of the speed reducer shaft 18 and end of the pinion shaft 20 is capable of change, as circumstances may demand.

In order to insure rotation of the table 24 with a minimum of friction, tapered roller bearings 55 are installed upon a top flange 58 of the outer table 25 to support thereon for rotation the upper flange 56 of the inner or rotary table 24, such upper flange carrying the ring gear 23 with which is meshed the pinion 22. Such tapered roller bearings 55 are also provided between a lower flange 58' on the outer or stationary table 25 and a lower flange 56' therebelow forming a part of the rotary table 24. Additionally vertically extending roller bearings 59 are carried in an annular recess or groove 57 in the outer or stationary table 25 to provide vertical antifriction contact between the rotary table 24 and the stationary table 25.

Suitable alignment dowels 65 are provided between the table sections as shown in FIG. 3, and also, as best shown in this figure, a base or composite flange 66 is provided to protect the lower tapered bearing 55 and to sit upon the ground around a tree during stages of operation to support the machine and thereby take load off of the arms 26, 26'.

Excavation is accomplished by means of blades 61 which extend downwardly through recesses 63 provided in shoes 60, 60' mounted on the inner periphery of the rotary table 24, such shoes being shown, part in section, in FIG. 3, the upper shoe 60 being shown in further detail in FIGS. 7 and 8. The blades 61 are curved as shown and have cutting teeth 62 thereon which should be specially hardened, or made of a wear resistant cutting material. Such blades 61 are also curved in the plane 90° from the plane of FIG. 4 as shown in FIG. 3.

Each upper shoe 60 is mounted on the inner periphery of the rotary table 24 by capscrews, and provides a recess 63 through which a blade 61 passes. The shoe includes an apron 72 as the upper part thereof having horizontally aligned guide openings 73 therein through which extend pins 74, 74' which have heads 75 enclosed by the apron within bores 76 in the inner face of the rotary table 24. Such heads confine springs 77 inwardly thereof which urge the pins 74, 74' outwardly. The blade 61 has therein longitudinally spaced apart slots 78, as shown in FIG. 9 of width slightly greater than the diameter of the pins 74 which extend thereinto as the blades 61 are fed downwardly.

In order to feed the blades into the earth, the tables 24, 25 are elevated by operation of the winch 11 initially to lift the tables a distance above the ground approximating the vertical distance between slots 78, and with the pins 74 for each blade positioned in the lowermost slot 78 thereof. Then the winch 11 is operated to lower the tables together with the blades carried around by the rotating table and thus the blades 61 follow the tables as they excavate, the pins 74 bearing downwardly against the shoulders 78' in the slots 78 to maintain downwardly urging, thrusting engagement with the blades. Thus, as the rotary table 24 is driven by the engine 16 to rotate within the stationary table 25, it carries the blades 61 around to cut away the formation about a tree, or about a mass of formation to be excavated, the winch being operated to lower the tables to follow the progress of the blades. As this rotation and lowering takes place, the process of excavation is best assisted by supplying a drilling fluid, as water, to the drilling operation, and for the purpose of illustrating this supply of fluid, spigots 70 are shown in FIG. 1. The drilling fluid reduces most of the softer formation parts to a gel or fluid mud which flows with the supplied drilling fluid, and thus the cuttings removed are minimized to a small volume easily contained within the rotary table and base 66 without clogging up operation.

When the tables have been lowered, following the progress of the blades, until the base 66 is at substantially ground level, the machine may then be lifted by winch operation, so that the pins 74 disengage from the slot shoulders 78' and slide upwardly along the upwardly and outwardly tapered slot surfaces to become engaged in the next slots 78 thereabove. Then the process of lowering and drilling, and then raising is repeated, and serially until a mass 67 has been excavated, as shown in FIG. 1.

For latching purposes latch pins 82 are provided to extend from the pins 74, 74' at right angles thereto to fit in slots 79 provided in latch brackets 80 carried by the apron 72 of the shoe 60. Thus, while excavation takes place, the pin 74' may be latched in inactive position, while the pin 74 is unlatched to engage in the groove or slot 78, and when excavation is completed, and it is time to retract the blades to deposit the excavated load, then the pins 74 may be latched out of position. At this time, at the end of drilling, the lugs 81 at the top of the blades shoulder on the upper shoes 60 whereby the load carried by the blades is supported. Now, to lift this load, it is only necessary to actuate the winch 11, which may be driven by a conventional power take-off from the propulsive mechanism of the vehicle 10, or by a drive, also conventional and not shown, which may be actuated from the engine 16. This causes the cables 12 to lift the arms 26, 26' and as these arms 26, 26' pivot upwardly about the pivot pins 27, the outer cylindrical table 25 to which the arms 26, 26' are pivotally connected is lifted thereby, and therewith the inner rotary table 24 is also lifted together with the whole assembly 24, 25, including the blades 61 with the ball of earth and roots 67 constrained thereby. Thus the tree 69 supported by the ball of earth and roots 67 is also lifted. The torque tube 19, constructed with universal connections at the outer ends of its slidable members 49', is thus adapted to accommodate this upward lifting of the assembly 24, 25, together with the ball 67 and tree 69, as the lower slidable member of the torque tube 19 pivots universally at its connection with the shaft of the speed reducer 18 and as the upper slidable member of the torque tube 19 pivots universally at its connection with the pinion shaft 20. The load comprising the assembly 24, 25 and the ball 67 and tree 69 carried thereby may thus be raised to some substantial elevation upwardly from the rear end of the truck 10, and the load pivoted as the axles 30 of the outer cylindrical table 25 rotate with relation to the arms 26, 26', so that the tree 69 may be brought forwardly to extend over the gasoline engine 16, A-frame 15, and winch 11, with the top of the tree 69 resting in transport upon the top of the cab of the vehicle 10.

Optionally, a line or rope may be tied to the bowl of the tree 69 above the machine and held at a position to the rear of the excavation, and in this case the machine will pivot on the arms so that the ball of earth and roots 67 will be forwardly of, and adjacent to the machine in position over the truck 10 while the top of the tree will be extending downwardly and rearwardly over the bed of the truck and the engine 16.

To remove the load carried, as an excavated tree or shrub, some initial barrier may be placed over the hole into which it is to be deposited, and the load lowered to rest thereon; then the tables 24, 25 may be lowered, with the result that the pins 74' will slide downwardly on the blades 61. Such lowering will place the pins in engagement with a slot 83. Then the barrier beneath the load or mass 67 and over the top of the excavated hole may be slid out from under it. Thereafter the tables 24, 25 may be lifted to lift the blades 61 therewith as the pins 74' shoulder at 84 in the slots 83 in such blades, with the consequence that the blades are drawn upwardly with relation to the mass 67 therein. At this point the mass 67 should begin to establish frictional contact with the hole, so that the tables 24, 25 may again be lowered with relation to the load and partially retracted blades, and upon engagement with a lower slot shoulder 84 by the pin 74' in each blade the tables 24, 25 may again be lifted to repeat the hereinabove described process until the blades 61 have been completely retracted and the mass is all in the excavated hole.

Obviously the same machine employed to excavate a tree for transplantation may first be employed to excavate a hole of substantially the same size as that left upon removal of the tree, or otherwise one such machine may be excavating the receiving holes while the other is excavating and transporting the trees to fill them.

Upon arrival at location at which the load is to be deposited, as at a hole previously excavated to receive an excavated tree, the pins 74 may be retracted and latched back as shown in FIG. 8, while the pins 74' are released to contact the blades 61. Each blade has spaced apart slots 83 therein with shoulders 84 upwardly and cammed or tapered downwardly and outwardly as shown in FIG. 10, such slots being slightly wider than the diameter of the pin 74' and spaced transversely of the blade 61 to fall opposite the pin 74' when the blade extends through the shoe slot 63.

Broadly, this invention considers a machine which can exacavate the hole into which a tree is to be transplanted, then advance under its own motive power to the location of a tree to be placed in such previously excavated hole, excavate such tree, return with it to the previously excavated hole, and then deposit the excavated tree in such hole, and thereafter retract its contact with such tree to leave it as transplanted.

The invention is not limited to the structures hereinabove described and shown in the drawings. For instance, the blades may be fed downwardly by other than the means disclosed including special automatic means, and they also may be retracted by mechanism. Additionally many other modifications and variations of structure are considered as such may fall within the broad spirit of the invention and within the broad scope of interpretation claimed and merited for the appended claims.

What is claimed is:

1. A tree excavating machine comprising a vertically split annular outer table mounted about a vertical axis, opposed pivots extending therefrom, arms with ends adjacent said table pivotally connected to said pivots and with their other ends pivotally connected to an engine powered vehicle, a hoisting means carried by said vehicle and attached to said arms adjacent said pivots to lift and to guy said arms, a split rotary annular table within said outer table and supported to rotate with relation to said outer table about said vertical axis, cam actuated latching means to latch said split tables together in operating position, a drive on said vehicle and connected to rotate said rotary table, and blades carried by said inner table and extending downwardly therefrom for excavating a tree and the like during said rotation, the connection between the inner table and the blades being such that the blades may be moved downwardly and toward said axis of rotation.

2. A tree excavating machine comprising a vertically split annular outer table mounted about a vertical axis, arms with ends adjacent said outer table pivotally connected at opposite locations thereon and with their other ends pivotally connected to an engine powered vehicle, a hoisting means carried by said vehicle and attached to said arms adjacent said pivotal connections to lift and to guy said arms, a split rotary annular table within said outer table and supported thereby to rotate with relation thereto about said vertical axis, a drive on said vehicle connected to rotate said rotary table, and blades carried by said inner table and extending downwardly therefrom for excavating a tree and the like during said rotation, the connection between the inner table and the blades being such that the blades may be moved downwardly and toward said axis of rotation.

3. A tree excavator and transplanter machine comprising a vertically split annular outer table mounted about a vertical axis and a split annular inner table supported for rotation within said outer table about said vertical axis, arms with ends adjacent said outer table pivotally connected at opposite locations thereon and with their other ends pivotally connected to an engine powered vehicle included by said machine, at least one of said arms being comprised of disconnectable sections, a hoisting means carried by said vehicle and attached to said arms adjacent the pivotal connections to said outer table, said hoisting means serving to lift and to guy said arms, a drive on said vehicle connected to rotate said rotary table, blades carried by said rotary table extending downwardly therefrom for excavating a tree and the like during said rotation, the connection between the inner table and the blades being such that the blades may be moved downwardly and toward said axis of rotation, whereby said hoisting means may elevate said arms and said excavated tree therewith to be transported to a location to be transplanted and thereafter the vehicle included means including said hoisting means being operable to position said ball of earth in a hole excavated therefor with said tree to upstand thereabove.

4. An excavating machine adapted to excavate and lift a tree and the like including roots to be transported away by a motor vehicle included as a part thereof, said machine including a vertically split annular outer table and a vertically split annular inner rotary table supported by said outer table upon upper and lower tapered roller bearings provided therebetween, vertically extending roller bearings between said tables and between said upper and lower bearings, means driven from said vehicle to rotate said rotary table, blades supported by said rotary table at peripherally spaced apart locations therewithin and extending downwardly therefrom for excavating a tree and the like during said rotation, the connection between the inner table and the blades being such, and the blades being so shaped that the blades may be moved downwardly and toward said axis of rotation, hoisting arms pivotally connecting opposite locations on said outer table and said motor vehicle, a hoisting means carried by said vehicle and connected to said arms adjacent said opposite locations to lift and to guy said arms whereby an excavated tree may be lifted upon said vehicle with said blades connected to the roots and soil therewith and thus transported by said vehicle.

5. A tree excavating machine comprising a vertically split annular outer table, arms with ends adjacent said outer table mounted about a vertical axis of said table and pivotally connected at opposite locations thereon and with their other ends pivotally connected to an engine powered vehicle, a hoisting means carried by said vehicle and attached to said arms to lift and to guy said arms, a split rotary annular table within said outer table and supported thereby to rotate with relation thereto about said vertical axis, a drive on said vehicle connected to rotate said rotary table, and blades carried by said inner table and extending downwardly therefrom for excavating a tree and the like during said rotation, the connection between the inner table and the blades being such that the blades may be moved downwardly and toward said axis of rotation.

6. A tree excavating machine, comprising a rotatable table and blades connected therewith, means for driving said table, means for raising and lowering said table, and latch means for selectively latching said blades at different longitudinal positions for forcing different lengths of each of said blades downwardly as said table is lowered during the rotation thereof, said latch means including means for alternately connecting said table and said blades together whereby said blades are lowered as said table is lowered and releasing said table from said blades whereby said blades remain in their lowered position as said table is raised.

7. A tree excavating machine, comprising a rotatable table and blades connected therewith, the improvement residing in said blades, wherein each of said blades is curved longitudinally in one plane and the lower end of each of said blades is also curved in a plane substantially at right angles with respect to said first named plane whereby the lower end of each of said blades extends forwardly of the vertical axis of the blade that the lower end extends therefrom.

References Cited in the file of this patent

UNITED STATES PATENTS

| | | |
|---|---|---|
| 293,490 | Miles | Feb. 12, 1884 |
| 488,918 | Clark | Dec. 27, 1892 |
| 594,668 | Wilkens | Nov. 30, 1897 |
| 1,607,784 | Spangler | Nov. 23, 1926 |
| 1,885,877 | Wheelden | Nov. 1, 1932 |
| 2,313,604 | Vogel | Mar. 9, 1943 |
| 2,650,063 | Hawkins | Aug. 25, 1953 |
| 2,669,065 | Clegg | Feb. 16, 1954 |
| 2,729,493 | Engel | Jan. 3, 1956 |
| 2,755,570 | Blackburn et al. | July 24, 1956 |
| 2,775,428 | Monthan | Dec. 25, 1956 |
| 2,863,258 | Gish | Dec. 9, 1958 |